United States Patent
Albright et al.

(10) Patent No.: US 6,382,683 B1
(45) Date of Patent: May 7, 2002

(54) HIGH PRESSURE GAS FITTING WITH NON-ROTATABLE FEATURES

(75) Inventors: John Albright, Nutly; Patrick P. Barber, Kinnelon; Kenneth W. Sawyer, Sparta; Lewis L. Aldridge, Parsippany, all of NJ (US)

(73) Assignee: Parker Hannifin Corp, Cleveland, OH (US)

(*) Notice: Subject to any disclaimer, the term of this patent is extended or adjusted under 35 U.S.C. 154(b) by 0 days.

(21) Appl. No.: 09/458,146

(22) Filed: Dec. 9, 1999

Related U.S. Application Data (60) Provisional application No. 60/052,290, filed on Jul. 11, 1997, and provisional application No. 60/052,294, filed on Jul. 11, 1997.

(51) Int. Cl.[7] ............ F16L 25/00; B65D 59/00
(52) U.S. Cl. ............ 285/330; 285/328; 285/379; 138/89; 138/96 T
(58) Field of Search ............ 285/901, 379, 285/328, 354, 121.5, 278, 388, 280, 281; 138/89, 96 T (56) References Cited

U.S. PATENT DOCUMENTS

| | | | |
|---|---|---|---|
| 3,473,832 A | * 10/1969 | Kreidel, Sr. et al. | 285/330 |
| 3,764,169 A | 10/1973 | St. Clair | |
| 3,799,584 A | * 3/1974 | Slocum | 285/45 |
| 3,951,172 A | * 4/1976 | Flegel | 138/89 |
| 4,205,866 A | * 6/1980 | McCracken | 285/281 |
| 4,647,079 A | * 3/1987 | Ohlsson | 285/276 |
| 4,669,763 A | * 6/1987 | Phillips | 285/346 |
| 5,060,987 A | 10/1991 | Miller | |
| 5,129,657 A | * 7/1992 | McManigal | 285/80 |
| 5,145,219 A | * 9/1992 | Babuder | 285/330 |
| 5,350,205 A | 9/1994 | Aldridge et al. | |
| 5,695,226 A | * 12/1997 | Gouda | 285/340 |

* cited by examiner

Primary Examiner—Lynne H. Browne
Assistant Examiner—Kenn Thompson
(74) Attorney, Agent, or Firm—Gerald E. Hespos; Anthony J. Casella (57) ABSTRACT

A non-rotational fitting assembly (10; 110; 210) is provided to prevent torsional forces of a nut (12, 112; 212) from being transmitted to a sealing face (16; 26; 246) of a fitting component (12; 22; 248). The assembly (10; 110; 210) includes at least one fitting component (22; 248) having a bearing face (28; 246) aligned orthogonal to the axis of the fitting component (22; 248). The assembly (10; 110; 210) also includes a nut (12; 112; 212) having a bearing face (36; 118) aligned orthogonal to the threads of the nut (26; 112; 212) and dimensioned for engagement with the bearing face (28; 246) of the fitting component (12; 22; 248). The assembly (10; 110; 210) further includes a smooth planar metallic bearing member (60; 132) for disposition adjacent the bearing face (28; 246) of the fitting component (12; 22; 248) and a smooth planar slip member (50; 134) disposed between the bearing member (60; 132) and the bearing face (36; 118) of the nut (12; 112; 212) for substantially isolating torsional forces of the nut (12; 112; 212) from the bearing face (36; 118) of the fitting component (12; 22; 248).

13 Claims, 6 Drawing Sheets

HIGH PRESSURE GAS FITTING WITH NON-ROTATABLE FEATURES

This application claims the benefit of U.S. Provisional Appl. No. 60/052,290 and U.S. Provisional Appl. No. 60/052,294, both of which were filed on Jul. 11, 1997.

BACKGROUND OF THE INVENTION

1. Field of the Invention

The subject invention relates to fittings for high pressure and vacuum fluid lines used in environments where high purity is necessary.

2. Description of the Prior Art

Many industrial processes require controlled amounts of very pure gases. Even small amounts of ambient gas or other contaminants can adversely affect the manufacturing process. The pure flows of gas typically are delivered to a specified location in a manufacturing plant by systems of pipes. Valves may be incorporated into the system to precisely control the flow of gas. Fittings may be employed selectively in the system to properly direct a flow of gas to selected locations in the manufacturing facility.

Pipe systems for carrying very pure flows of gases generally do not rely upon welded connections because the weldment may include contaminants that can leak into the system. Additionally, the weld location often defines a weak point that can be affected adversely by vibration or shock.

Additionally, most pipe systems for carrying very pure flows of gases cannot rely upon plastic or elastomeric components that are in communication with the gas flow stream. Plastic and elastomeric components are known to cause a leaching of contaminants into the gas stream. In view of the above, connections of one pipe to another or connections of a pipe to a fitting or valve typically are carried out with threaded metallic couplings.

The typical prior art fitting for a high pressure fluid line includes first and second tubular metallic components having fluid passages extending therethrough. Each component has a mating face to be disposed in juxtaposed relationship to the mating face of the other component. The mating faces each may be characterized by a toroidal sealing bead disposed to register with the toroidal sealing bead of the other component. The components are urged axially toward one another by threaded members. For example, a first of the two components may have an array of external threads integrally formed thereon. The second of the two components may have a shoulder facing in a direction away from the mating face. A nut may be mounted over a second component and may include an inwardly extending flange dimensioned for engaging the shoulder on the second component. The nut may include an array of threads for threadable engagement with the threads formed on the first component. Threaded engagement of the nut with the threads on the first component will urge the mating faces of the two components toward one another. An annular metallic gasket typically is disposed between the mating faces. Thus, the mating faces, and in particular the toroidal sealing beads on the respective mating faces, will be urged into tight sealing engagement with the gasket.

Other prior art fittings include first and second substantially identical components. The first and second components each include a mating face and a shoulder facing away from the mating face. First and second components of such a prior art fitting are used with a mateable pair of male and female nuts. Each nut will include an inwardly extending flange dimensioned for engaging the shoulder on the component. Tightening of the nuts together will cause the inwardly extending flanges on the nuts to engage the shoulders on the coupling components. Thus, threaded tightening of the nuts will urge the coupling components toward one another and into sealing engagement with a gasket disposed therebetween.

Rotation of one or both nuts in the prior art fitting will cause the flange of the nut to wipe over the shoulder of the associated fitting component. Friction between the flange and the shoulder can transmit rotational forces from the nut to the component. Thus, one component may rotate relative to the opposed component. This rotation typically is small, but will cause a wiping of one mating face against the gasket. This wiping can cause a galling or scratching of the mating face, and particularly of the toroidal sealing bead on the mating face. Galling or scratching can be generated each time the coupling is connected and disconnected. The surface discontinuities associated with such galling or scratching can define paths for gas leakage into or out of the fluid coupling. As noted above many industrial processes require very pure gas flows. Galling or scratching can enable the leakage of ambient air into the gas stream and can adversely affect the purity of the gas flowing through a fitting. As a result, it is desirable to prevent rotation of coupling components during the connection of the components with one another.

Some prior art coupling components have included complex and costly arrangements of ball bearings disposed between the flange on the coupling nut and the shoulder on the component being coupled. The costs associated with such ball bearing fixtures make those fixtures undesirable.

A very effective prior art fitting for substantially preventing rotation is shown in U.S. Pat. No. 5,350,205 which is assigned to the assignee of the subject invention. The fitting shown in U.S. Pat. No. 5,350,205 includes a thrust bearing disposed between the flange on the coupling nut and the shoulder on the component being coupled. The thrust bearing is formed from a material having a hardness greater than the hardness of the coupling component with which it is used. The coupling nut used adjacent the thrust bearing is formed from a material that is harder than the thrust bearing. For example, the thrust bearing shown in U.S. Pat. No. 5,350,205 may be formed from a cobalt chromium-nickel alloy provided with a thin coating of silver.

The fitting shown in U.S. Pat. No. 5,350,205 has performed well. However, there is a desire to provide even further improvements.

Components of such gas flow systems are manufactured and partly assembled in ultra clean environments maintained by the manufacturer of such gas flow systems. These components or subassemblies of such components then are transported to the industrial facility that will use the system to deliver highly pure flows of specified gases. The manufacturer of pipes, fittings and valves for such gas flow systems typically will take steps to prevent contamination during transportation. These steps will include sealing the system from ambient atmosphere and charging the system with an acceptable high pressure gas, such as nitrogen. The seals are intended to prevent either an inflow or an outflow of gas. Pressurized nitrogen is intended to prevent a migration of the lower pressure ambient air into the sealed system.

The sealing of the system typically is carried out by merely threadedly engaging a cap over the mating end of a pipe that will subsequently be connected to other parts of a gas flow system. A gasket initially may be positioned in the cap. Thus, threaded tightening of the cap onto the pipe, nipple or other such component will urge the gasket into sealing engagement with the toroidal sealing bead on the mating end of the pipe. Upon delivery of the piping system subassembly to the installation site, the cap will be threadedly removed and the mating end will be joined to other components in the system in the conventional manner described above.

Sealing caps as described above are used in other instances as well. For example, an industrial facility utilizing highly pure gas flows frequently will be reconfigured to meet changing product demands. Reconfigurations of this type may involve sealing off a section of the gas flow system. The prior art threaded cap with a gasket positioned therein may be utilized for this sealing-off of portions of the system. The threaded cap may eventually be removed if and when the system is reconfigured.

Portions of a system may be sealed periodically to permit a purging of at least a section of the system. The above-described prior art sealing caps are threadedly tightened onto the mating end of a pipe in the system and the system is subjected to a pressurized flow of a purging gas. Upon completion of the purging, the sealing cap may be removed and the mating end of the previously sealed pipe may be reconnected to other parts of the system.

Leakage of contaminants into a highly pure gas flow system can occur if the mating faces of components in the system are galled, scratched or otherwise damaged. More particularly, gaskets may not adequately seal surface discontinuities caused by galling or scratching, and hence the surface discontinuity may define a passage for contaminants to travel into the gas flow system. Damage to the mating face of a fitting can occur if another metal component is wiped across the mating face. This can occur, for example, when the above described sealing cap is rotatably tightened against the toroidal sealing bead of the prior art fitting. Thus, the prior art sealing cap that is intended to prevent contamination actually can lead to contamination during a subsequent reconnection of the fitting.

SUMMARY OF THE INVENTION

The subject invention is directed to a fitting comprising at least one tubular component and at least one nut, the tubular component and the nut have engagement faces that preferably are aligned in a plane extending perpendicular to the axis of the tubular component and perpendicular to the rotational axis of the nut. Thus, rotational engagement of the nut with an array of mateable threads will urge the engagement face of the nut toward the engagement face of the tubular component, To prevent torsion forces of the nut from being transferred to the tubular component, the fitting further comprises a smooth planar metallic member positioned adjacent the engagement face of the tubular component and a smooth planar slip member disposed between the metallic member and the engagement face of the nut. The slip member comprises a material having a very low coefficient of friction when positioned adjacent other metallic members of the fitting. For example, the slip member may be a disc or annular washer consisting of PTFE, or may comprise a disc or annular washer comprising a very hard material, such as stainless steel, coated with PTFE.

In one embodiment, the subject invention is directed to a fitting comprising first and second generally tubular components having mating faces. The mating faces may include toroidal sealing beads disposed and dimensioned for substantial registration with one another. A gasket may be disposed between the mating faces. One or both of the coupling components is provided with a shoulder facing away from the mating face. A coupling nut is mounted over the coupling component having the shoulder. The coupling nut includes an inwardly extending flange dimensioned to lie substantially in registration with the shoulder of the coupling component.

The fitting of the subject invention further includes a slip washer and a retaining ring. The slip washer preferably is formed from a very hard material, such as stainless steel coated with PTFE (Teflon). The slip washer is disposed to lie adjacent the inwardly extending flange on the nut. The retaining ring preferably is a split annular ring formed from stainless steel. The split configuration enables the retaining ring to be radially collapsed for insertion into the nut. The retaining ring then may be expanded to lock the slip washer in place adjacent the shoulder on the nut. The slip washer enables the nut to transmit axial forces to the coupling component without transmitting rotational forces. Thus, the mating faces of the coupling components can be urged axially toward or away from one another without rotational wiping therebetween. As a result, galling of the respective mating faces will not occur and a high quality seal can be achieved even after repeated connections and disconnections.

In another embodiment, the subject invention is directed to a non-rotational gas-tight cap assembly. The assembly includes a cap having a substantially tubular side wall with first and second ends. The cap is substantially opened at the second end of the tubular side wall. However, an end wall extends continuously across the cap at the first end of the tubular side wall. The tubular side wall of the cap further includes an internal circumferentially generated surface extending from the open second end of the tubular side wall to the end wall of the cap. The internal surface of the cap includes an array of internal threads for threaded engagement with a fitting to be sealed. The internal surface region of the tubular side wall may include a non-threaded portion extending between the threads and the end wall of the cap.

The non-rotational gas-tight cap assembly further includes a seal assembly. The seal assembly comprises a sealing gasket, a slip disk and a carrier for maintaining the sealing gasket and the slip disk in substantially adjacent face-to-face relationship with one another. The sealing gasket is formed from a metal material that will exhibit appropriate sealing characteristics when urged against the mating face of the fitting to be sealed. Preferably, the sealing gasket is a substantially planar metallic member having a circular periphery larger than the outside diameter of the portion of the mating face to be sealed, but smaller than the inside diameter of the cap. For example, the outside diameter of the sealing gasket may be slightly larger than the outside diameter of the toroidal sealing bead on the fitting. The preferred sealing gasket is formed from nickel.

The slip disk of the seal assembly preferably is formed from a substantially inert material that is easily rotatable relative to the sealing gasket. For example, the slip disk may be formed from PTFE (Teflon) or from metal coated with PTFE. The slip disk also may be a substantially planar member with a circular periphery and a diameter substantially equal to the diameter of the sealing gasket.

The carrier functions to hold the sealing gasket and the slip disk in face-to-face relationship with one another. The carrier may be formed from stainless steel and may include a substantially planar end wall having a substantially circular periphery defining a diameter equal to or slightly greater than the diameters of the sealing gasket and slip disk, but smaller than the inside diameter of the opening in the cap. The carrier further includes a plurality of retaining fingers projecting from the end wall. The retaining fingers are dimensioned to engage the sealing gasket and the slip disk therebetween. Portions of the retaining fingers remote from the end wall of the carrier may be angled inwardly for trapping the sealing gasket and the slip disk.

The cap assembly of the subject invention is employed by initially mounting the seal assembly into the cap such that the circular end wall of the carrier is adjacent to the end wall of the cap. The cap then is engaged rotatably with the threads on the fitting to be sealed. Tightening of the cap onto the fitting to be sealed will urge the sealing gasket into sealing engagement with the mating face of the fitting. Tightening of the cap, however, will not generate rotational movement of the sealing gasket relative to the mating face of the fitting. Rather, the slip disk disposed between the sealing gasket and the end wall of the carrier will isolate the sealing gasket from the torque generated by the cap. Thus, the cap assembly can be tightly sealed with the fitting without damaging the mating face of the fitting.

In an alternate embodiment, the carrier may be an axially short substantially cylindrical ring formed from a plastic material and having a stepped inner circumferential surface. The inner circumferential surface at one end of the plastic carrier ring may be configured and dimensioned for receiving and frictionally retaining the sealing gasket and slip disk therein. The inner circumferential surface at the opposed end of the carrier may be dimensioned for frictional mounting on the end of the fitting. In this embodiment, the plastic carrier, the sealing gasket and the slip disk may be preassembled and then may be mounted onto the end of the fitting to be sealed. This subassembly is visually observable to provide a clear indication that the subassembly is present and properly positioned before tightening the cap onto the fitting.

DETAILED DESCRIPTION OF THE PREFERRED EMBODIMENTS

Figure 1:
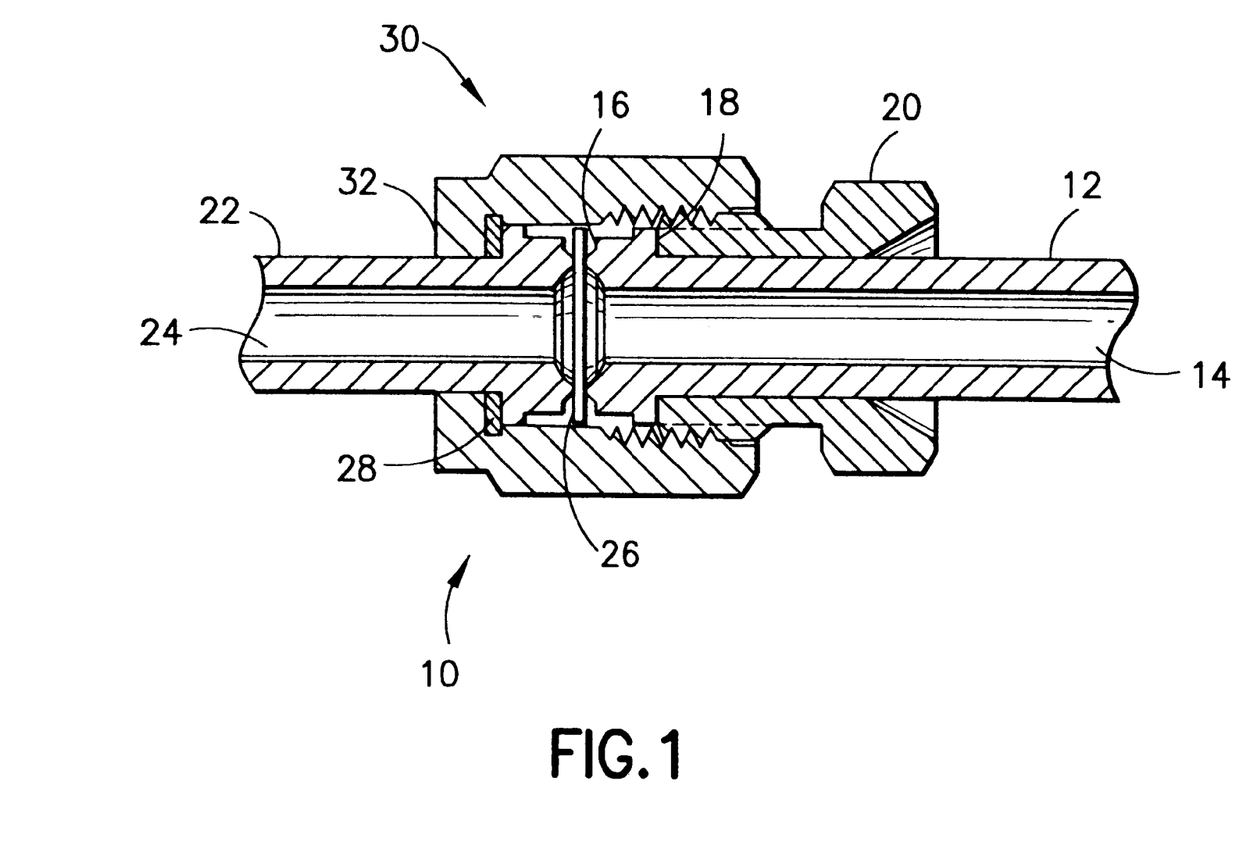
FIG. 1 is a cross-sectional view of a fitting in accordance with the subject invention.
Figure 2:
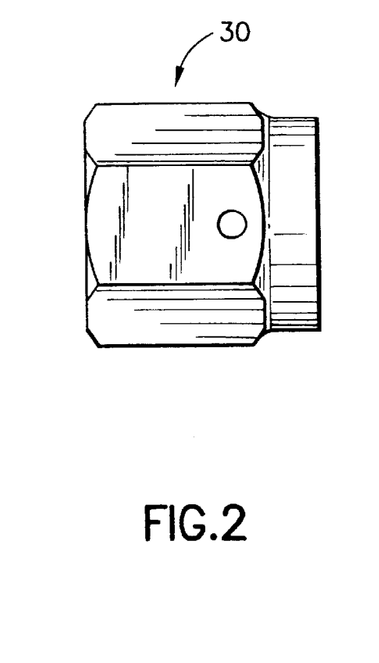
FIG. 2 is a side elevational view of the nut assembly.
Figure 3:
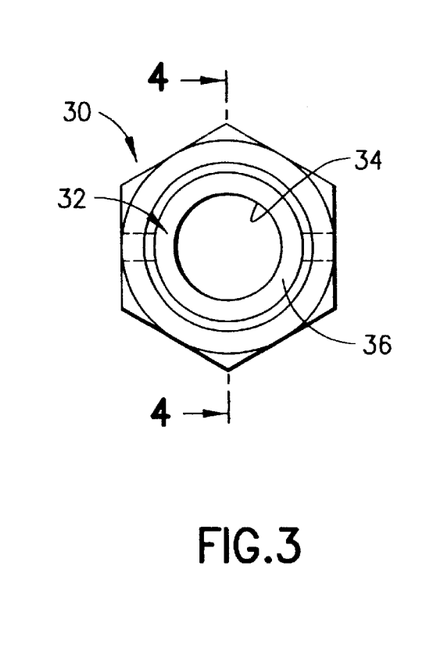
FIG. 3 is an end elevational view of the nut assembly shown in FIG. 2.
Figure 4:
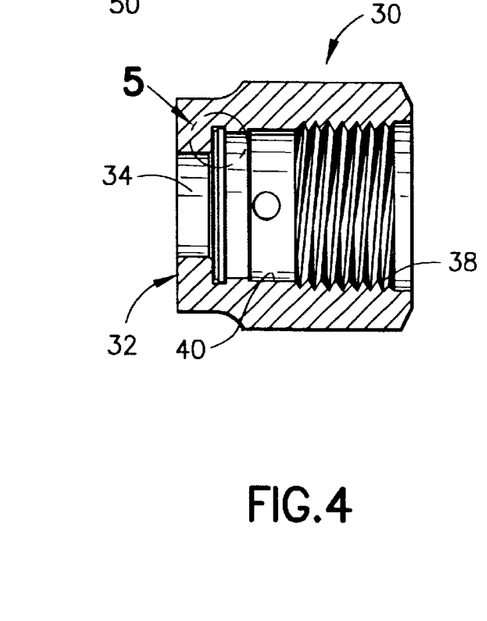
FIG. 4 is a cross-sectional view taken along line 4—4 in FIG. 3.
Figure 5:
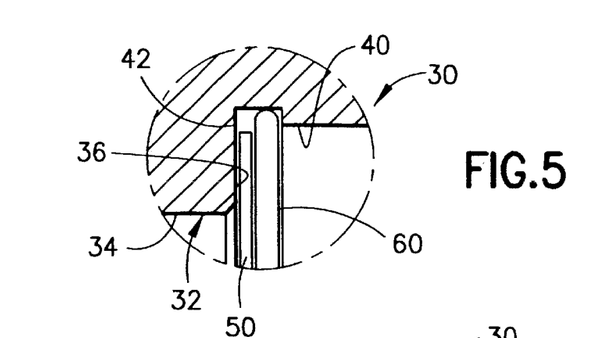
FIG. 5 is an enlarged sectional view of a portion of the nut assembly of FIG. 4 showing the region into which the slip washer and retaining ring are seated.

A fitting in accordance with a first embodiment of the subject invention is identified generally by the numeral 10 in FIG. 1. The fitting includes a first generally tubular coupling component 12 having a gas passage 14 extending therethrough. The first coupling component 12 includes a mating face 16 characterized by a toroidal sealing bead. The first coupling component 12 further includes a shoulder 18 formed thereon and facing oppositely from the mating face 16. A male nut 20 surrounds the first coupling component 12 and has an end engaged with the shoulder 18 of the first coupling component 12.

The fitting 10 further includes a second coupling component 22 having a gas passage 24 extending therethrough and a mating face 26. The mating face 26 is characterized by a toroidal sealing bead. The second coupling component 22 also includes a shoulder 28 facing oppositely from the mating face 26 thereof. The second coupling component is used with a female nut 30 having an inwardly extending flange 32. The flange 32 includes an opening 34 defining a diameter greater than the diameter of portions of the second coupling component 22 adjacent to the shoulder 28 thereof. However, the opening 34 defines a diameter smaller than the outside diameter of the shoulder 28. As a result, a bearing face 36 of the flange 32 of the female nut 30 can exert axial forces against the shoulder 28 of the second coupling component 22 as explained further herein. The female nut 32 includes an array of internal threads 38 and an unthreaded portion 40 disposed between the threads 38 and the flange 32. The nut 30 further includes an annular groove 42 adjacent flange 32. The groove 42 defines an inside diameter greater than the inside. diameter defined by the unthreaded portions 40 of the nut 30.

Figure 6:
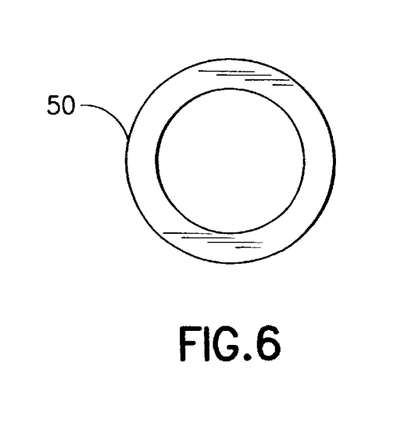
FIG. 6 is a top plan view of a slip washer in accordance with the subject invention.
Figure 7:
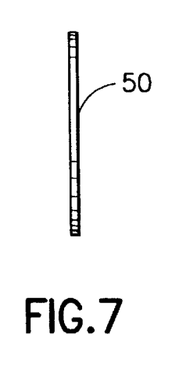
FIG. 7 is a side elevational view of the slip washer shown in FIG. 6.

The fitting 10 further includes a slip washer 50. The slip washer 50 is a planar structure, as shown most clearly in FIG. 7 and is annular as shown most clearly in FIG. 6. The outside diameter of the slip washer 50 is less than the inside diameter of the non-threaded portion 40 of the nut 30. However, the outside diameter of the slip washer 50 is greater than the inside diameter of the aperture 34 defined by the flange 32. Thus, the slip washer 50 can be slid into the open end of the female nut 30 and can seat against the thrust surface 36 of the flange 32. The slip washer 50 is formed from a stainless steel or other hard metal coated with PTFE (Teflon).

Figure 8:
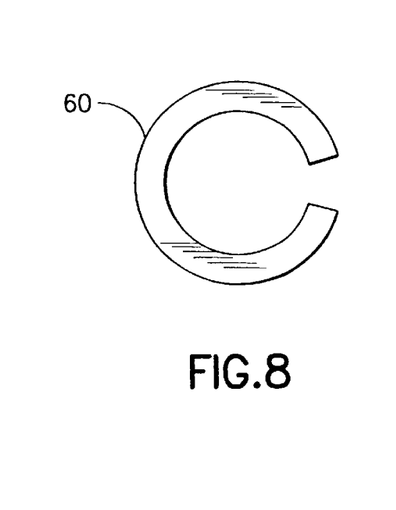
FIG. 8 is a top plan view of the retaining ring used in the subject invention.
Figure 9:
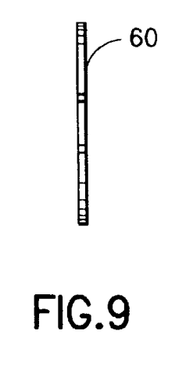
FIG. 9 is a side elevational view of the retaining ring.

The fitting further includes a retaining ring 60. The retaining ring is generally planar as shown in FIG. 9 and substantially annular as shown most clearly in FIG. 8. However, the retaining ring 60 does not define a complete annulus. Rather, the retaining ring 60 is split to enable radial compression. The retaining ring 60, in its unbiased condition, defines an inside diameter that is less than the outside diameter of the slip washer 50. The retaining ring 60 in its unbiased condition also defines an outside diameter that is less than the inside diameter defined in the annular groove 42 of the nut 30, but greater than the inside diameter 40 of the unthreaded portion of the nut 30. Thus, as shown most clearly in FIGS. 10 and 11, the retaining ring 60 can be circumferentially collapsed and urged into the female nut 30 until the retaining ring 60 aligns with the groove 42 in the nut 30. Forces on the retaining ring 60 then can be released, thereby permitting the retaining ring to resiliently return to an undeflected condition. In this condition, the retaining ring 60 will effectively be trapped within the groove 42 and will hold the slip washer 50 in the nut 30 and adjacent the flange 32 thereof. The retaining ring is formed from a stainless steel or a hard metallic alloy, such as Elgiloy.

The fitting 10 can be assembled in the conventional manner by threadedly engaging the female nut 30 with the male nut 20. Tightening of the nuts 30, 20 will cause the shoulder 32 of the female nut 30 to rotate against the slip washer 50. However, the PTFE coated slip washer 50 and the adjacent retaining ring 60 will prevent a transmission of rotational forces from the nut 30 to the shoulder 28 of the coupling component 22. As a result, the coupling component 22 will not rotate relative to the coupling component 12 or the gasket disposed therebetween. This absence of rotational movement between the mating faces and the gasket will prevent galling or scratching and hence will enable repeated connections and disconnections with little probability of gas leakage being caused thereby.

Figure 10:
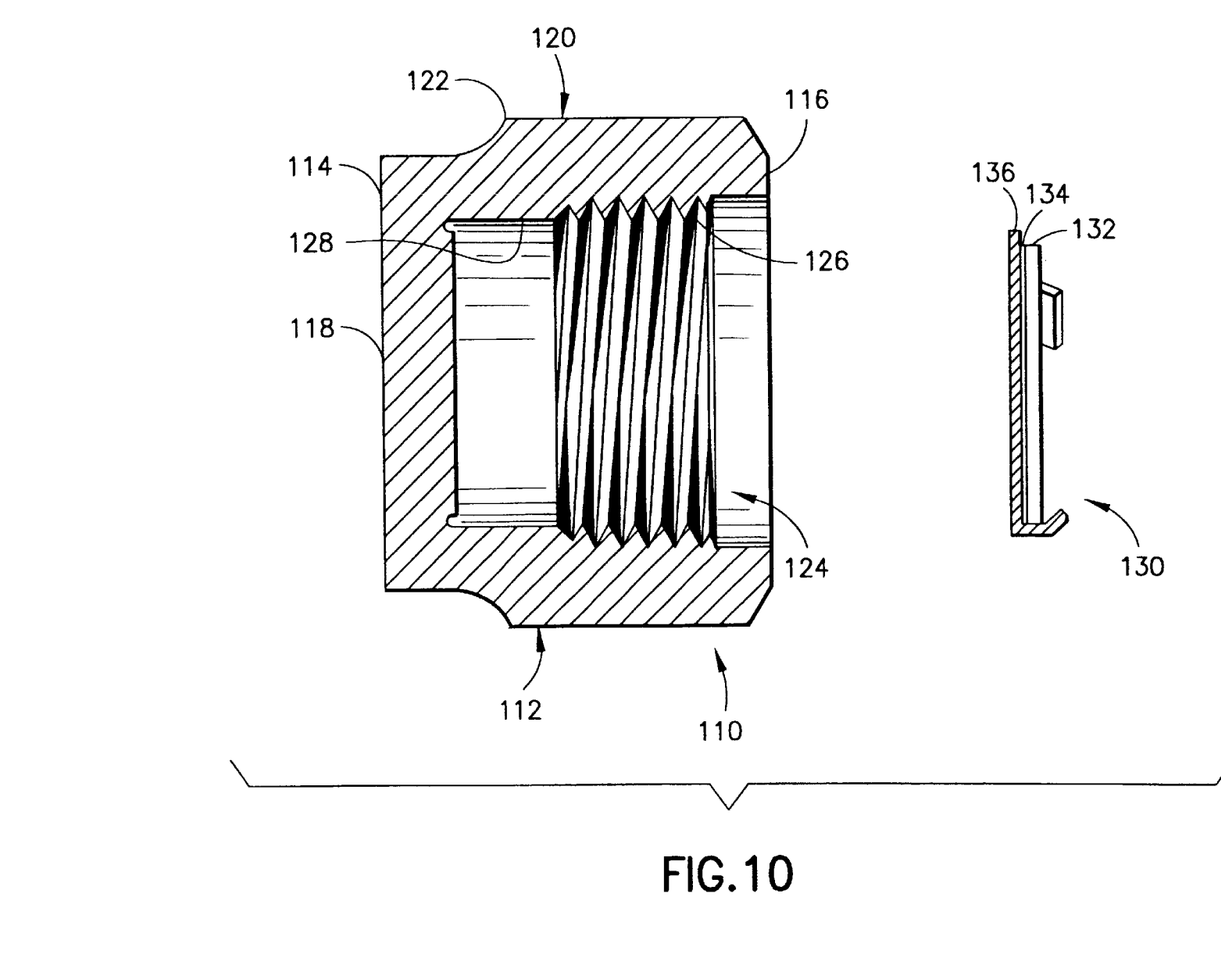
FIG. 10 is an exploded perspective view of a cap assembly in accordance with the subject invention.

A second embodiment of the invention includes a cap assembly identified generally by the numeral 110 in FIG. 10. The cap assembly 110 includes a cap 112 having opposed first and second ends 114 and 116. An end wall 118 extends continuously across the cap 112 at the first end 114. Portions of the cap 112 between the end wall 118 and the second end 116 of the cap 112 define a generally tubular side wall 120. Outer surface regions 122 of the tubular side wall 120 are of a non-cylindrical configuration to facilitate rotation of the cap 112 with a conventional wrench-like tool. The second end 116 of the cap 112 defines an opening 124 which extends to the end wall 118. Portions of the opening between the first and second ends 114 and 116 of the cap 112 define an array of internal threads 126. A non-threaded seal seat 128 is defined between the threads 126 and the end wall 118.

Figure 11:
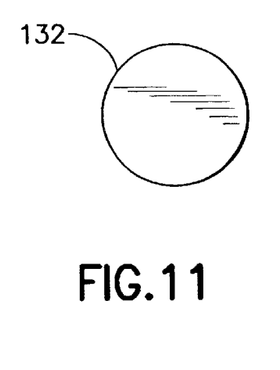
FIG. 11 is a top plan view of the sealing gasket.
Figure 12:
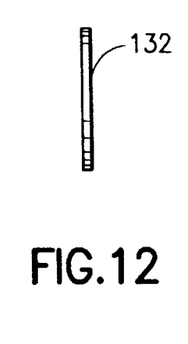
FIG. 12 is a side elevational view of the sealing gasket.

The cap assembly 110 further includes a seal assembly 130. The seal assembly 130 comprises a sealing gasket 132, a slip disk 134 and a carrier 136. The sealing gasket 132 as shown in FIGS. 11 and 12 is a planar member having a circular outer periphery defining a diameter greater than the diameter of the toroidal sealing bead to be sealed by the cap assembly 110. However, the diameter of the sealing gasket 132 is less than the inside diameter defined by the sealing seat 128 on the cap 112. The sealing gasket 132 preferably is formed from nickel 200, and preferably defines a thickness of about 0.030 inch.

Figure 13:
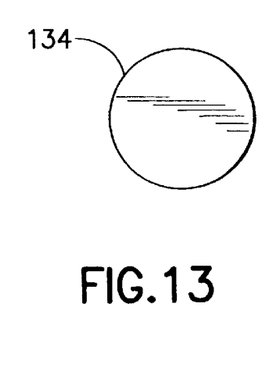
FIG. 13 is a top plan view of the slip disk.
Figure 14:
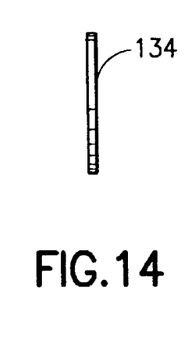
FIG. 14 is a side elevational view of the slip disk.

The slip disk 134, as shown in FIGS. 13 and 14, also is a substantially planar member with a circular periphery having a diameter substantially equal to the diameter of the sealing gasket 132. The slip disk 134 preferably is formed from a PTFE material, such as Teflon, or is formed from nickel or stainless steel coated with PTFE and preferably defines a thickness of about 0.005 inch.

Figure 15:
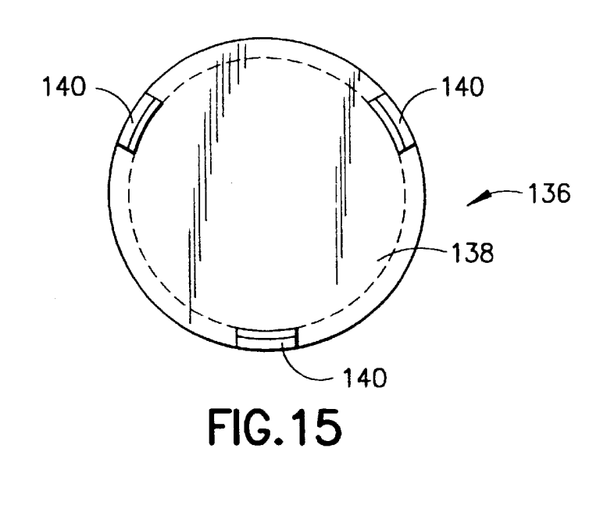
FIG. 15 is a top plan view of the carrier.
Figure 16:
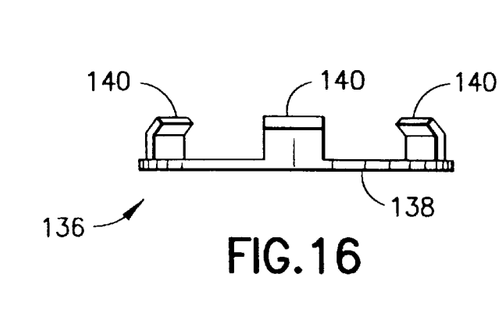
FIG. 16 is a side elevational view of the carrier.

The sealing gasket 132 and the slip disk 134 are retained in substantially adjacent face-to-face relationship by the carrier 136 which is shown in FIGS. 15 and 16. The carrier 136 includes a planar substantially circular end wall 138 and a plurality of fingers 140 projecting therefrom. The fingers 140 are dimensioned to receive the sealing gasket 132 and the slip disk 134 therebetween. Ends of the fingers 140 remote from the end wall 138 are angled inwardly to prevent inadvertent separation of the sealing gasket 132 and slip disk 134 from the carrier 136.

The cap assembly 110 is employed by inserting the seal assembly 130 into the open end 124 of the cap 112 such that the end wall 138 of the carrier 136 is seated adjacent to the end wall 118 of the cap 112. Threads 126 of the cap 112 then are engaged threadedly with threads on or associated with the fitting to be sealed. The cap 112 is rotated such that the sealing gasket 132 is urged into tight sealing engagement with a toroidal sealing bead or other such sealing structure on the mating face of the fitting. The slip disk 134 adjacent the sealing gasket 132 will prevent torque from being transmitted from the cap 112 to the sealing gasket 132. Hence, the sealing gasket 132 will not rotate against the toroidal sealing bead or other such sealing structure on the mating face of the fitting, and therefore will not damage the fitting that is being sealed by the cap assembly 110.

Figure 17:
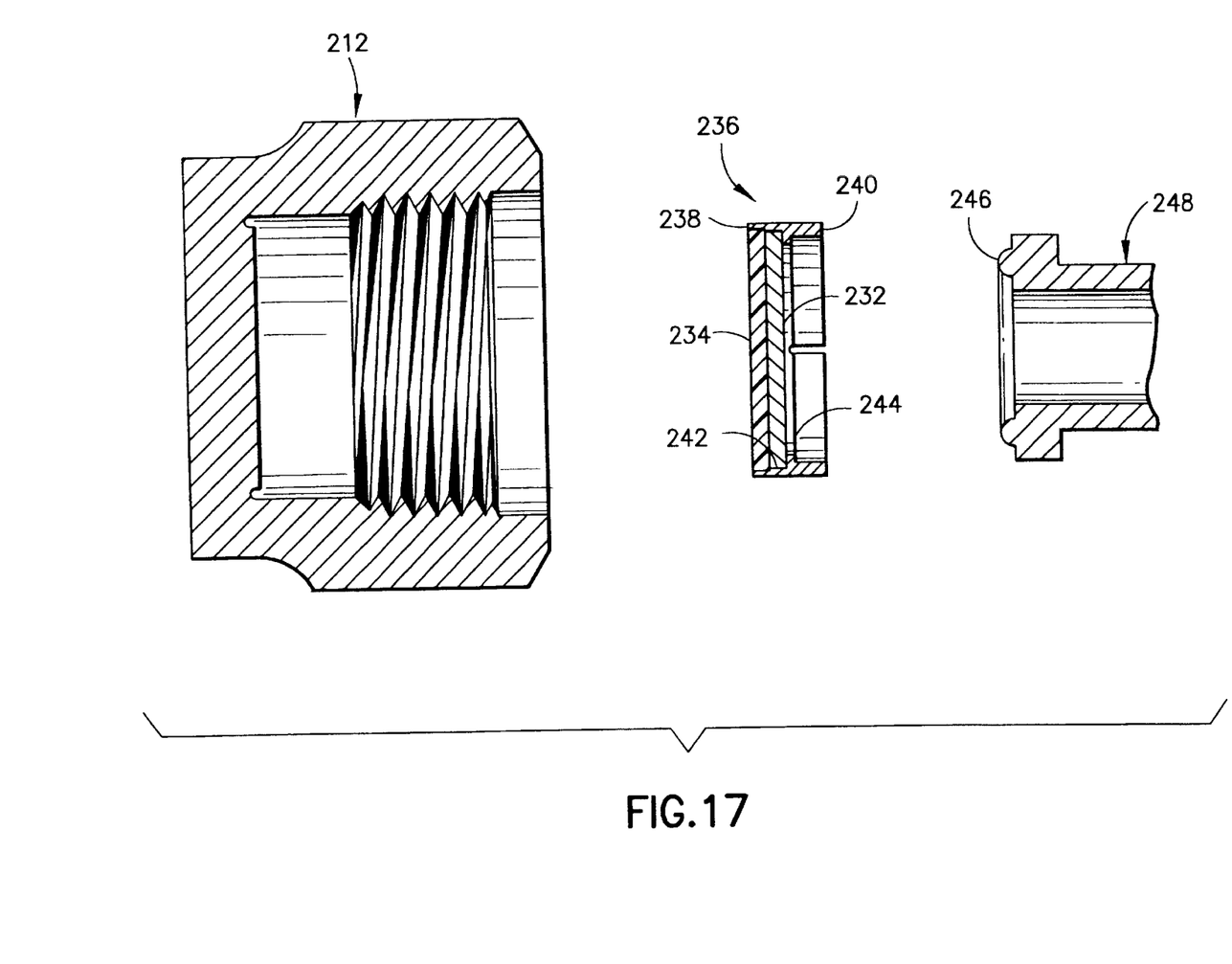
FIG. 17 is a cross-sectional view of an alternate assembly.

An alternate cap assembly is illustrated in FIG. 17 and is identified generally by the numeral 210. The cap assembly 210 includes a cap 212 that is substantially identical to the cap 112 described above and illustrated in FIG. 10. The cap assembly 210 also includes a sealing gasket 232 and a slip disc 234 substantially as described above and illustrated in FIGS. 10–16. However, the cap assembly 210 includes a carrier 236 that is significantly different from the carrier illustrated in FIGS. 10, 15 and 16. More particularly, the carrier 236 is a short generally cylindrical member formed from a plastic material and having opposed first and second ends 238 and 240. The carrier 236 includes an outer cylindrical surface that is substantially smoothly cylindrical and an inner surface 242 that is of stepped configuration. More particularly, the inner surface 242 is characterized by an inwardly directed flange 244 intermediate the opposed ends 238 and 240. The flange 244 is generally annular and defines an inside diameter that is less than the diameter of the sealing gasket 232 but greater than the diameter of the toroidal sealing bead 246 on the fitting 248 to be sealed. Portions of the inner surface 242 between the flange 244 and the first end 238 of the carrier 236 are dimensioned to frictionally retain the sealing gasket 232 and the slip disk 234. Portions of the inner surface 242 between the flange 244 and the second end 240 are dimensioned to be frictionally retained on and around the component 248 to be sealed. In this regard, at lest one slit 250 is formed in the second end 240 of the carrier 236. The carrier 236 may then be dimensioned to require a slight expansion of the second end 240 for mounting the carrier 236 on the component 248. The inherent resiliency of the plastic from which the carrier 236 is formed will then resiliently hold the carrier 236 on the fitting 248. This embodiment provides the desirable advantage of permitting the cap assembly 210 to be mounted on the fitting 248 rather than in the cap 210. This provides a clear visual indication of the presence of the subassembly which comprises the sealing gasket 232, the slip disk 234 and the carrier 236.

What is claimed is:

1. A non-rotational fitting assembly comprising:

a generally tubular fitting component having a longitudinal axis and a bearing face lying in a plane substantially orthogonal to the longitudinal axis;

a nut having an array of threads generated about an axis of rotation and having a substantially planar bearing face aligned orthogonal to the axis of the threads, at least a portion of said nut surrounding at least a portion of said fitting, such that the bearing face of the fitting and the bearing face of the nut are in substantially juxtaposed relationship to one another;

a substantially smooth planar metallic bearing member disposed between the bearing faces of the fitting component and the nut and substantially adjacent the bearing face of the fitting component;

a smooth planar slip member having at least outer surfaces formed from a non-metallic material with a coefficient of friction lower than the metallic bearing member, said slip member being disposed intermediate the bearing member and the bearing face of the nut; and means for retaining the bearing member and the slip member in proximity to a selected one of the fitting component and the nut, the retaining means comprises a carrier having a planar portion for disposition between the slip member and the bearing face of the nut and a plurality of resilient fingers extending from the planar portion for resiliently gripping both the bearing member and the slip member, whereby the slip member substantially isolates torsional forces generated by the nut from the fitting component.

2. A non-rotational fitting assembly comprising;

a generally tubular fitting component having a longitudinal axis and a bearing face lying in a plane substantially orthogonal to the longitudinal axis;

a nut having an array of threads generated about an axis of rotation and having a substantially planar bearing face aligned orthogonal to the axis of the threads, at least a portion of said nut surrounding at least a portion of said fitting, such that the bearing face of the fitting and the bearing face of the nut are in substantially juxtaposed relationship to one another;

a substantially smooth planar metallic bearing member disposed between the bearing faces of the fitting component and the nut and substantially adjacent the bearing face of the fitting component:

a smooth planar slip member having at least outer surfaces formed from a non-metallic material with a coefficient of friction lower than the metallic bearing member, said slip member being disposed intermediate the bearing member and the bearing face of the nut; and means for retaining the bearing member and the slip member in proximity to a selected one of the fitting component and the nut, the retaining means comprises a generally cylindrical plastic retainer having opposed first and second ends and an inwardly extending flange therebetween, portions of the retainer between the first end and the flange being dimensioned to frictionally retain the bearing member and the slip member therein, portions of the retainer between the second end and the flange being dimensioned for resilient retention on portions of the fitting component in proximity to the engagement face thereof, whereby the slip member substantially isolates torsional forces generated by the nuts from the fitting component.

3. The non-rotational assembly of claim 1, further comprising a second fitting component having a central axis, said first and second fitting components having mating faces aligned substantially orthogonal to the longitudinal axes of the fitting component, an annular gasket being disposed between the mating faces of the first and second fitting components, the bearing face of the first fitting component facing away from the mating face thereof, the bearing face of the nut being generally annular, the bearing member and the slip member each being substantially annular.

4. The non-rotational assembly of claim 3, wherein the bearing member is formed from stainless steel, and wherein the slip member has at least outer surfaces thereof formed from PTFE.

5. The non-rotational assembly of claim 4, wherein the slip member comprises an annular washer formed from nickel and a PTFE coating on said nickel.

6. A non-rotational fitting assembly comprising;

a generally tubular fitting component having a longitudinal axis and a bearing face lying in a plane substantially orthogonal to the longitudinal axis, wherein the bearing face of the fitting component is an end face thereof;

a nut having an array of threads generated about an axis of rotation and having a substantially planar bearing face aligned orthogonal to the axis of the threads, at least a portion of said nut surrounding at least a portion of said fitting, such that the bearing face of the fitting and the bearing face of the nut are in substantially juxtaposed relationship to one another, the nut defining a cap with the bearing face of the nut defining a continuous planar end wall aligned orthogonal to the axis of the threads of the nut;

a substantially smooth planar metallic bearing member disposed between the bearing faces of the fitting component and the nut and substantially adjacent the bearing face of the fitting component; and a smooth planar slip member having at least outer surfaces formed from a non-metallic material with a coefficient of friction lower than the metallic bearing member, said slip member being disposed intermediate the bearing member and the bearing face of the nut, the bearing member and the slip member each being substantially planar disks, whereby the slip member isolate torsional forces generated by the nut from the fitting component.

7. The non-rotational assembly of claim 5, wherein the bearing member is formed from stainless steel, and wherein the slip member comprises at least outer surfaces formed from PTFE.

8. The non-rotational assembly of claim 7, wherein the bearing face of the fitting component is a portion of a substantially annular bead thereon.

9. A non-rotational fitting assembly comprising:

a generally tubular fitting component having a longitudinal axis and a bearing face lying in a plane substantially orthogonal to the longitudinal axis;

a nut having an array of threads generated about an axis of rotation and having a substantially planar bearing face aligned orthogonal to the axis of the threads, at least a portion of said nut surrounding at least a portion of said fitting, such that the bearing face of the fitting and the bearing face of the nut are in substantially juxtaposed relationship to one another;

a substantially smooth planar metallic bearing member disposed between the bearing faces of the fitting component and the nut and substantially adjacent the bearing face of the fitting component;

a smooth planar slip member having at least outer surfaces formed from a non-metallic material with a coefficient of friction lower than the metallic bearing member, said slip member being disposed intermediate the bearing member and the bearing face of the nut; and a carrier having a planar portion for disposition between the slip member and the bearing face of the nut and a plurality of resilient fingers extending from the planar portion for resiliently gripping both the bearing member and the slip member, whereby the slip member substantially isolates torsional forces generated by the nut from the fitting component.

10. The non-rotational assembly of claim 9, further comprising a second fitting component having a central axis, said first and second fitting components having mating faces aligned substantially orthogonal to the longitudinal axes of the fitting component, an annular gasket being disposed between the mating faces of the first and second fitting components, the bearing face of the first fitting components facing away from the mating face thereof, the bearing face of the nut being generally annular, the bearing member and the slip member each being substantially annular.

11. A The non-rotational assembly of claim 10, wherein the bearing member is formed from stainless steel, and wherein the slip member has at least outer surfaces thereof formed from PTFE.

12. The non-rotational assembly of claim 11, wherein the slip member comprises an annular washer formed from nickel and a PTFE coating on said nickel.

13. A non-rotational fitting assembly comprising;

a generally tubular fitting component having a longitudinal axis and a bearing face lying in a plane substantially orthogonal to the longitudinal axis;

a nut having an array of threads generated about an axis of rotation and having a substantially planar bearing face aligned orthogonal to the axis of the threads, at least a portion of said nut surrounding at least a portion of said fitting, such that the bearing face of the fitting and the bearing face of the nut are in substantially juxtaposed relationship to one another;

a substantially smooth planar metallic bearing member disposed between the bearing faces of the fitting component and the nut and substantially adjacent the bearing face of the fitting component;

a smooth planar slip member having at least outer surfaces formed from a non-metallic material with a coefficient of friction lower than the metallic bearing member, said slip member being disposed intermediate the bearing member and the bearing face of the nut; and a generally cylindrical plastic retainer having opposed first and second ends and an inwardly extending flange therebetween, portions of the retainer between the first end and the flange being dimensioned to frictionally retain the bearing member and the slip member therein, portions of the retainer between the second end and the flange being dimensioned for resilient retention on portions of the fitting component in proximity to the engagement face thereof, whereby the slip member substantially isolates torsional forces generated by the nuts from the fitting component.

\* \* \* \* \*